G. A. WOOD.
TRUCK BODY TILTING MECHANISM.
APPLICATION FILED JUNE 23, 1917. RENEWED OCT. 17, 1919.
1,325,663.
Patented Dec. 23, 1919.
2 SHEETS—SHEET 1.
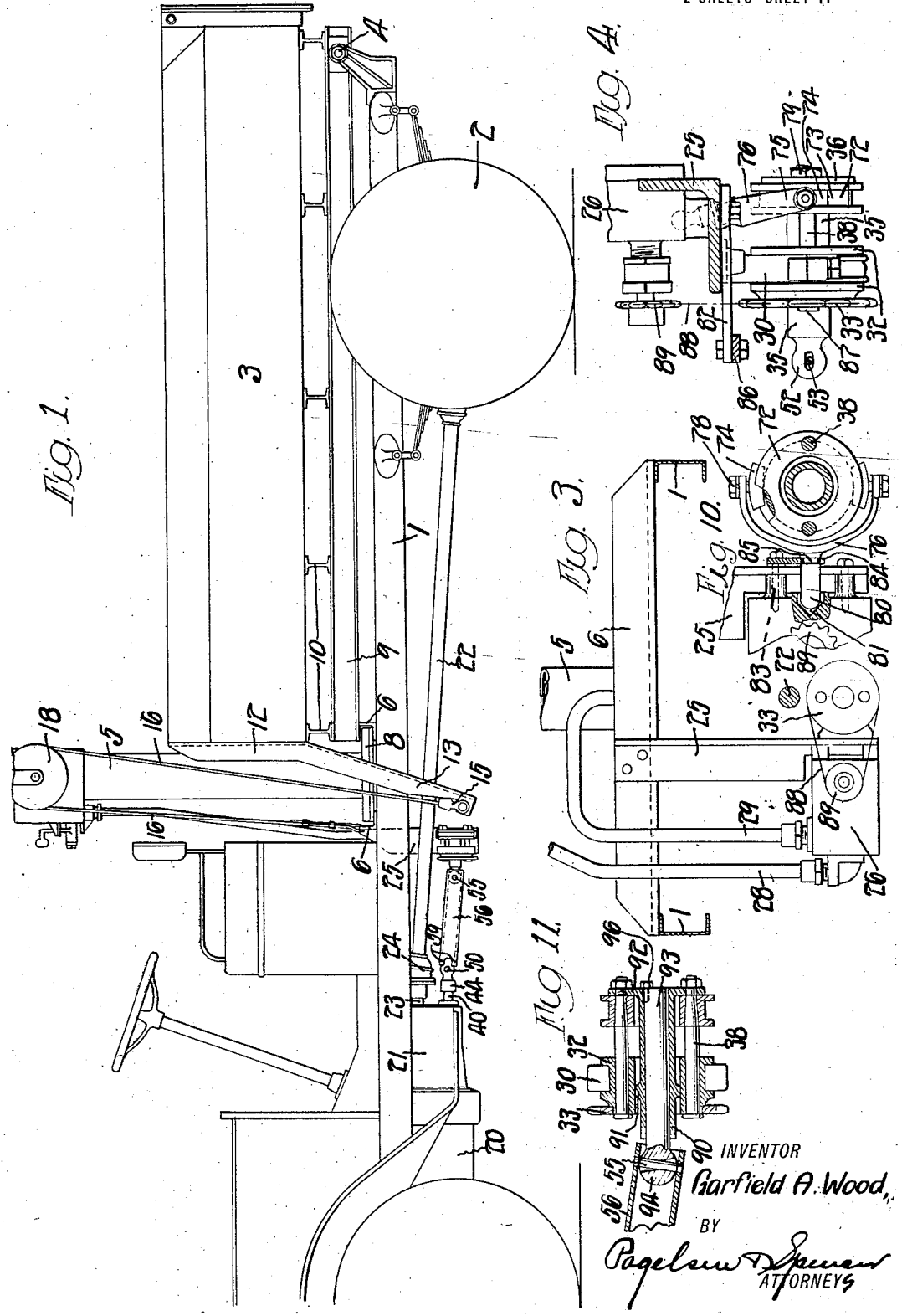
INVENTOR
Garfield A. Wood,
BY
Pagelsen & Spencer
ATTORNEYS

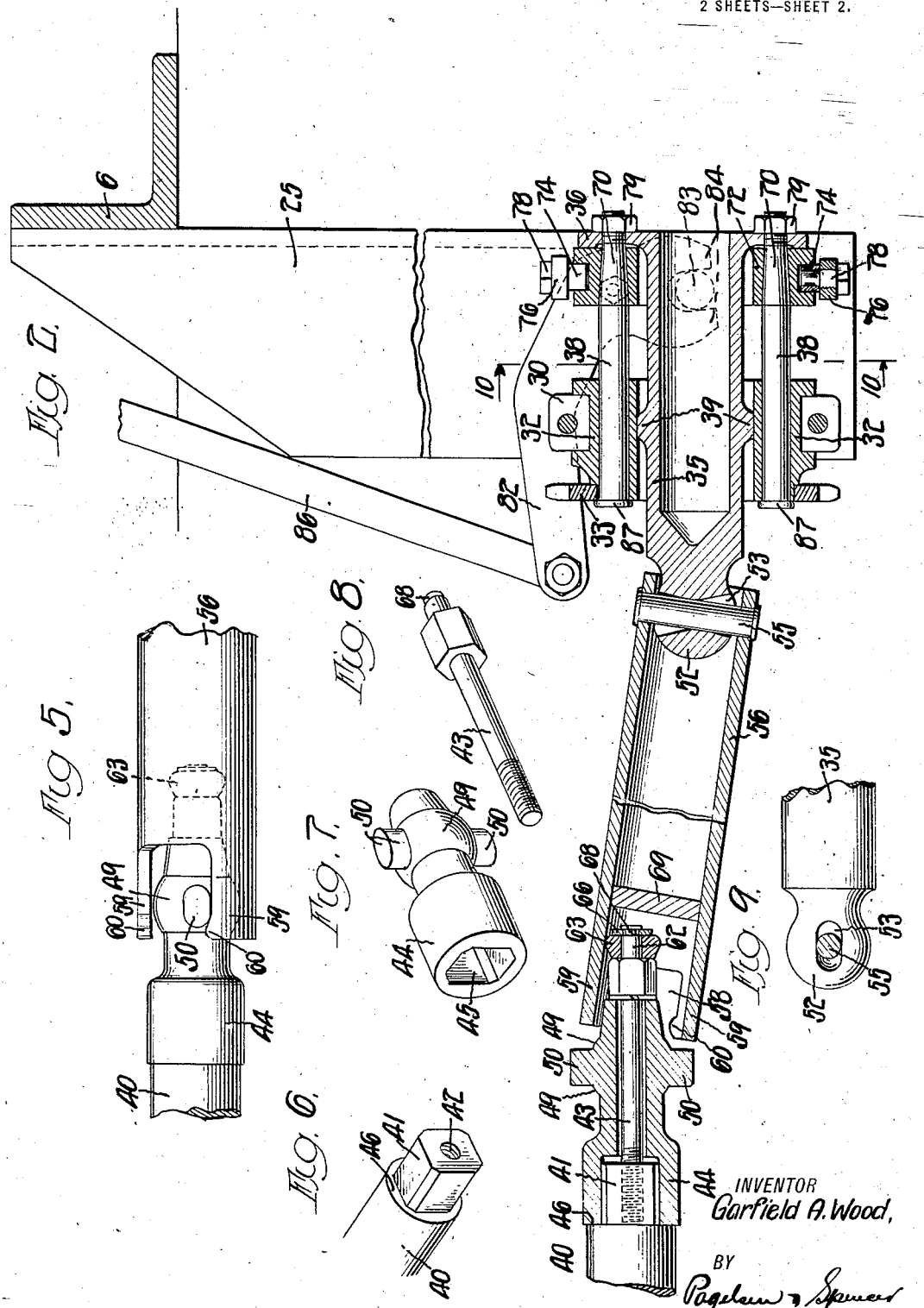

UNITED STATES PATENT OFFICE.

GARFIELD A. WOOD, OF DETROIT, MICHIGAN.

TRUCK-BODY-TILTING MECHANISM.

1,325,663. Specification of Letters Patent. Patented Dec. 23, 1919.

Application filed June 23, 1917, Serial No. 176,459. Renewed October 17, 1919. Serial No. 331,510.

*To all whom it may concern:*

Be it known that I, GARFIELD A. WOOD, a citizen of the United States, and residing at Detroit, in the county of Wayne and State of Michigan, have invented a new and Improved Truck-Body-Tilting Mechanism, of which the following is a specification.

It is customary to use a hydraulic hoisting cylinder to tilt the body of a motor truck for dumping purposes; these cylinders and the associated mechanism for dumping the bodies are usually made by one manufacturer whereas the chassis and power plants of the trucks on which they are installed are built by various other manufacturers and in widely different designs. The present invention relates to means whereby the hoisting mechanism may be driven from a driven shaft of the truck, said means being of a nature such as to allow substantially the entire hoisting means to be made standard regardless of ordinary variations in the size, shape and location of the parts of the different chassis and power plants.

To this end the invention comprises, in combination with a transmission countershaft and a pump driving gear removed therefrom longitudinally of the vehicle and out of alinement therewith, shafting for driving the gear from the countershaft, said shafting being so constructed and arranged as to allow relative universal movement at two points along its length, whereby deflection due to loads on the hoisting mechanism is freely allowed. The invention also consists in driving means of the nature just described wherein a portion at least of the shafting is bodily movable toward and from the countershaft to make or break the driving connection; also in clutch shafting comprising a tubular shaft having its ends slotted to form jaws that are readily engageable with jaws on a second clutch member carried by the countershaft; also in means for supporting the end of the tubular clutch shaft on the second clutch member and for relieving the parts of friction when they are out of driving relation. The invention further consists in certain details of construction shown, described and claimed.

The present invention is an improvement on the construction disclosed and claimed in my application for patent Serial Number 142405, filed January 15, 1917.

In the drawings, Figure 1 is a side view showing a preferred embodiment of the invention. Fig. 2 is an enlarged fragmentary central vertical section corresponding thereto. Fig. 3 is a fragmentary vertical section looking rearwardly from a transverse plane approximately intersecting the seat, the tubular shaft being omitted. Fig. 4 is a fragmentary horizontal section corresponding thereto. Fig. 5 is an enlarged detail view showing the engagement of the clutch members. Figs. 6, 7 and 8 are respectively, perspective views of the end of the countershaft, the clutch member attached thereto and the bolt whereby the attachment is made. Fig. 9 is a fragmentary view showing the slot in which the cross bolt of the clutch tube or shaft is received. Fig. 10 is a section on the line 10—10 of Fig. 2. Fig. 11 is a fragmentary vertical section showng a modification.

1 indicates the side bars of the truck, 2 the rear wheels, and 3 the hopper body mounted to tilt about the pivots 4 when a piston rod (not shown) is projected upwardly in the cylinder 5. This general construction is well known. In this instance, however, one of the cross bars 6 upon which the base 8 of the cylinder rests is preferably arranged to receive the front ends of the side bars 9 of the body, it being understood that the latter includes the cross beams 10 on which the hopper directly rests. The body also preferably includes body arms formed of angle or channel irons, the upper portions 12 of which are secured to the front end of the hopper and the lower portions 13 of which are bent forwardly to receive the shackles 15 of the cables 16 that pass over the pulleys 18 carried by the piston rod, the other ends of the pulleys being preferably anchored to the front cross bar 6 near the outer ends thereof. The truck is driven in any desired way, preferably by means of the usual engine 20, transmission or gear box 21 and propeller shaft 22, connected to a main driving shaft 23 by a universal joint 24.

Depending from the front cross bar is a support 25, preferably an angle iron, upon which a gear pump 26, that draws oil from the upper portion of the cylinder through the suction pipe 28 and delivers it to the base thereof through the pressure pipe 29, is mounted. Also mounted in a bearing 30 (Figs. 2, 3 and 4) on the side of the support opposite the pump is a rotatable member 32 that includes the sprocket gear 33, these members being in effect one, although made separately to facilitate shop operations. The member 32 is hollowed or bored out to make room for a longitudinally slidable shaft member 35 (preferably hollow to save weight) the rear end of which has a flange 36 perforated to receive pins 38 that pass through the member 32 and form primary guiding means for the shaft member 35. The member 35 is also preferably provided with a rib or flange 39 that serves as a secondary alining means.

Projecting rearwardly from the gear box is a counter shaft 40 having its end 41 substantially rectangular in cross-section and tapped at 42 to receive the threaded end of a screw bolt 43, whereby a clutch member 44 (having a socket 45 conforming to the end 41) may be held firmly against the shoulder 46 on the countershaft and therefore in proper axial alinement therewith. A lock washer is preferably interposed between the head of the bolt and the end of the clutch member. It will be observed that the latter includes a substantially spherical portion 49 from which the alined studs or clutch teeth 50 project. The member 43 might be made integral with the shaft 40.

The shaft member 35 is provided with the spherical head 52 having a transverse slot 53, the shape of which may vary considerably; as shown, it is wider longitudinally of the shaft than transversely thereof and tapers inwardly to the center from both sides. Projecting through the slot is a pin 55, the ends of which also pass through the walls of a clutch tube 56 whose opposite end is slotted at points substantially 180° apart and preferably through arcs of substantially 90° as indicated at 58 to form jaws 59 between which the studs or teeth 50 are received. The slots, being of much greater width than the teeth, it follows that the latter are readily engaged with the jaws when the clutch tube is thrust forwardly. The walls of the slots are preferably left overhanging at 60, which tends to retain the clutch members in engagement with each other.

It will be understood that the countershaft may turn continuously. In order to relieve the clutch parts of friction as well as to hold the clutch tube in proper position to engage the clutch member 44, the bolt 43 is continued at 62 to form a bearing for a roller 63 upon which the weight of the end of the clutch tube is carried when the clutch members are out of engagement. When the parts are in driving relation the tube rests on the spherical portion 49 of the member 44. The roller is retained in any suitable way, for example, by means of a washer 66 over which the end of the part 62 is riveted.

In practice the countershaft is seldom, if ever, alined with the gear 32—33, the amount which one is offset in respect to the other, as well as the distance between them, varying considerably in the different makes of trucks. With this construction, however, all parts, with the exception of the tube 56, may be made standard, and the tube may be shipped in extra length and cut off and perforated to receive the pin 55 in accordance with the particular job. A wooden plug 69 may be driven into the tube 56 to retain lubricant for the roller 63. Instead of making the member 56 of a tube, the central portion might be solid as is obvious.

By this construction deflection of the hoisting mechanism as the heavy loads are received thereon is freely allowed; the shaft 40 may also be located close to the propeller shaft (as shown it is just below the latter), thus enabling the use of a gear box of minimum size and interfering to the least possible extent with the various mechanisms usually found in this region, as well as allowing clearance for the fluctuations of the propeller shaft.

Various means may be employed for shifting the shafting toward and from the gear box. A shown, the pins 38 are tapered at 70 and received in an annular spool-like member 72 having a circumferential groove 73 in which are received shoes 74 pivotally mounted in the ends 75 of a yoke member 76 by means of threaded pins 78 (Fig. 3). Nuts 79 hold the member 72 tightly against the flange 36. The other end 80 (Figs. 4 and 10) of the member 76 is received in a socket 81 formed in the pump, and a lever 82 (pivoted on a stud bolt 83 and having a divided end 84 that fits into a groove 85 of the yoke member) together with a link 86 (Fig. 2) constitutes means for swinging the member 76 about a vertical axis. The pins 38 may have heads 87 that engage with the member 32 to limit the movement in one direction. The pump is driven from the gear 33 by means of a chain 88 and gear 89.

It is evident that many changes may be made in the construction of the several parts. In Fig. 11, the member 35 is replaced by a two-part member, one part 90 of which has a rib 91 and a flange 92 corresponding to the rib 39 and flange 36 heretofore described. The part 90 is hollow and receives the shaft 93 upon which a head 94 of the same construction as the head 52 is formed. Compensation for the differences in alinement and position of the various major parts may be secured by cutting off the shaft 93 to the proper length on the job and thereafter tapping partly in said shaft and partly in the element 90 to receive a locking screw or key 96.

In accordance with the patent statutes, I have shown and described what I regard as the most desirable embodiment of my invention, but, as stated above, the actual details are subject to much variation; I do not, therefore, wish to be limited except as indicated by the subjoined claims.

I claim:—

1. A motor vehicle including a frame, transmission gearing mounted thereon and including a countershaft, a supplementary support carried by the frame and spaced longitudinally from the transmission gearing, a rotatable member carried by the supplementary support and out of alinement with the countershaft, shafting for driving said rotatable member from the countershaft, a portion of said shafting being shiftable toward and from the transmission gearing to connect or disconnect the rotatable member with the countershaft, said shiftable portion being out of alinement with the axes of both the rotatable member and the countershaft, and means carried by the supplementary support for shifting said shiftable portion of the shafting to make or break the driving connection at will.

2. A motor vehicle comprising a frame, a countershaft, a gear box in which the countershaft is supported, a gear out of alinement with the axis of the countershaft, a support for the gear independent of the gear box, means, including a hollow clutch shaft slidable toward and from the countershaft to form a disconnectible driving connection located substantially at the gear box, and means associated with the support for the gear whereby said connection is established or broken at will.

3. A motor vehicle comprising a frame, a transmission including a countershaft, a driven mechanism on the vehicle, said mechanism including a gear out of alinement with the countershaft, clutch jaws rigid with the countershaft, a clutch member, means connecting the clutch member to the gear constructed and arranged to allow relative angular movement of the clutch member in respect to the gear and to cause the gear to rotate with the clutch member, said clutch member being shiftable endwise toward and from the countershaft to engage said clutch jaws at will, and a manually operable lever for shifting said clutch member to or from engagement with said jaws at will.

4. A motor vehicle comprising a frame, a transmission including a countershaft, a driven mechanism on the vehicle, said mechanism including a gear out of alinement with the countershaft, clutch jaws rigid with the countershaft, a tubular clutch shaft, rotatable with but free to swing in respect to the gear, said clutch shaft also being shiftable endwise toward and from the countershaft, the end of the tubular member being slotted to form jaws between which the first mentioned clutch jaws are received when in one position, and a manually operable lever for shifting said clutch shaft to or from engagement with said first named jaws at will.

5. A motor vehicle comprising a frame, a driving shaft, a driven mechanism on the vehicle, said mechanism including a gear out of alinement with the shaft, a clutch member rigid with the shaft, a tubular clutch shaft rotatable with the gear and slidable toward and from the first named clutch member to drive the gear from the driving shaft at will, means for sliding the clutch shaft to connect it to the clutch member or disconnect it therefrom, one end of the first named clutch member being received in the end of the tubular clutch shaft and supporting the latter in all relative positions of the parts.

6. A motor vehicle comprising a frame, a driving shaft, a driven mechanism on the vehicle, said mechanism including a gear out of alinement with the shaft, a clutch member rigid with the shaft, a tubular clutch shaft rotatable with the gear and slidable toward and from the first named clutch member to drive the gear from the driving shaft at will, means for connecting the tubular clutch shaft to the gear so constructed and arranged that the shaft has limited swinging movement in respect to the gear, one end of the first named clutch member being received in the adjacent end of the tubular clutch shaft and supporting the latter in all relative positions of the parts, and anti-friction means carried by the first named clutch member and interposed between it and the inner surface of the tubular clutch shaft.

7. A motor vehicle comprising a gear box, a countershaft projecting therefrom, said countershaft having a shouldered end, said end being tapped to receive the threaded end of a bolt, a hollow clutch member mounted on said end, said clutch member being rotatable with the shaft, a bolt passing through the clutch member and threaded into the end of the countershaft whereby the latter is held firmly to the shoulder and in alinement with the countershaft, and a tubular clutch member slidable toward and from the first named clutch member to engage therewith at will.

8. A motor vehicle comprising a driving shaft having rigid therewith a clutch member including jaws, a driven gear out of alinement with the clutch member, a clutch shaft, means connecting the clutch shaft to the gear so constructed and arranged that the shaft is allowed limited free swinging movement in respect to the axis of the gear, said clutch shaft and said connecting means being shiftable bodily toward and from the driving shaft and having jaws for engaging the first named clutch jaws in one position whereby the gear may be driven from the driving shaft at will, said first named clutch member including anti-friction means on which the adjacent end of the clutch shaft rests when the jaws are disengaged from one another and being constructed and arranged to lift said end of the clutch shaft from said anti-friction means when the jaws are in driving relation to one another.

9. A motor vehicle comprising a driving shaft having rigid therewith a clutch member including jaws, a driven gear out of alinement with the clutch member, a clutch shaft, means connecting the clutch shaft to the gear so constructed and arranged that the shaft is allowed limited free swinging movement in respect to the axis of the gear, said clutch shaft and said connecting means being shiftable bodily toward and from the driving shaft and having jaws for engaging the first named clutch jaws in one position whereby the gear may be driven from the driving shaft at will, said first named clutch member including a roller coaxial with the driving shaft on which the adjacent end of the clutch shaft rests when the jaws are disengaged from one another.

10. A motor vehicle comprising a driven shaft, a hollow driving gear having its axis substantially parallel to but offset from that of the shaft, a plurality of guide pins slidable through said gear, a shaft rigid with the pins and projecting through the gear, said shaft member having a head slotted transversely, a pin passing through said slot, a tubular clutch member through which the pin also passes, whereby universal swinging movement is allowed between the tubular shaft member and the second named shaft, and clutch means whereby connection may be made between the clutch shaft and the driven shaft at will.

11. A motor vehicle comprising a driven shaft having clutch jaws rigid therewith, a hollow driving gear having its axis substantially parallel to but offset from that of the shaft, a shaft constrained to rotate with the gear and slidable therethrough, a clutch shaft having universal swinging movement in respect to the last named shaft and constrained to rotate therewith, said clutch shaft including a tubular portion having its end slotted to embrace the first named jaws when in one position.

12. A motor vehicle comprising a frame, a transmission including a countershaft, a driven mechanism on the vehicle, said mechanism including a gear out of alinement with the countershaft, clutch jaws rigid with the countershaft, a clutch shaft rotatable with but free to swing in respect to the gear, said clutch shaft also being shiftable toward and from the counter shaft, the end of the clutch shaft being slotted and shaped to form undercut jaws between which the first mentioned jaws are received when in one position.

GARFIELD A. WOOD.